(12) United States Patent
Wong et al.

(10) Patent No.: US 9,691,300 B2
(45) Date of Patent: Jun. 27, 2017

(54) TEXT-TO-TOUCH TECHNIQUES

(75) Inventors: Ling Jun Wong, Escondido, CA (US);
True Xiong, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 1187 days.

(21) Appl. No.: 12/887,478

(22) Filed: Sep. 21, 2010

(65) Prior Publication Data

US 2012/0070805 A1    Mar. 22, 2012

(51) Int. Cl.
*G09B 21/00* (2006.01)

(52) U.S. Cl.
CPC ......... *G09B 21/005* (2013.01); *G09B 21/004* (2013.01)

(58) Field of Classification Search
CPC ......... G08B 6/00; G06F 3/016; G09B 21/001; G09B 21/003; G09B 21/005; G09B 21/008
USPC .......... 434/112–114; 715/701, 702; 345/173; 340/407.1, 407.2
See application file for complete search history.

(56) References Cited

U.S. PATENT DOCUMENTS

| | | | |
|---|---|---|---|
| 5,736,978 A | 4/1998 | Hasser et al. | |
| 6,211,861 B1 | 4/2001 | Rosenberg et al. | |
| 6,700,553 B2 | 3/2004 | Becker et al. | |
| 6,762,749 B1 * | 7/2004 | Gouzman et al. | 345/163 |
| 6,834,373 B2 | 12/2004 | Dieberger | |
| 6,906,697 B2 * | 6/2005 | Rosenberg | 345/156 |
| 7,316,566 B2 | 1/2008 | Carro | |
| 7,952,566 B2 * | 5/2011 | Poupyrev et al. | 345/173 |
| 8,179,375 B2 * | 5/2012 | Ciesla et al. | 345/173 |
| 8,207,832 B2 * | 6/2012 | Yun et al. | 340/407.2 |
| 8,665,216 B2 * | 3/2014 | Karasin et al. | 345/163 |
| 2002/0045151 A1 | 4/2002 | Roberts et al. | |
| 2004/0241623 A1 * | 12/2004 | Lenay et al. | 434/112 |
| 2005/0206622 A1 | 9/2005 | Cote et al. | |
| 2005/0233287 A1 | 10/2005 | Bulatov et al. | |
| 2008/0294984 A1 | 11/2008 | Ramsay et al. | |
| 2010/0055651 A1 | 3/2010 | Rantala et al. | |

FOREIGN PATENT DOCUMENTS

JP         2004252176 A  *  9/2004

* cited by examiner

*Primary Examiner* — Peter Egloff
(74) *Attorney, Agent, or Firm* — John L. Rogitz

(57) ABSTRACT

Text-to-touch techniques, in accordance with embodiment of the present technology, include apparatuses and methods for receiving content including textual portions and non-textual portions. The textual portions include letters, select words, numbers and punctuation having recognized Braille codes. The non-textual portions may include metadata, graphics, formatting, decorations, hyperlinks, radio buttons, submit buttons, check boxes, windows, icons, fields and/or the like. The systems and methods convert the textual portion to Braille codes and select non-textual portions to haptic feedback. The Braille code may then be output to a user. In addition, the haptic feedback associated with various Braille codes may also be output to the user along the associated Braille codes.

5 Claims, 5 Drawing Sheets

TEXT-TO-TOUCH TECHNIQUES

BACKGROUND OF THE INVENTION

Braille devices, also commonly referred to as Braille terminals, Braille readers or Braille displays, display Braille character to allow visually impaired users to "read" using the tactile sense (referred to herein as tactile reading). A Braille device will typically include a plurality of Braille cells. Alternatively, the Braille device may include a rotating Braille wheel. Each Braille cell or the rotating Braille wheel includes a plurality of selectively raiseable "dots" for outputting a given Braille code. The Braille device may also include a plurality of keys (e.g., Perkins Brailler) that a user can actuate to enter inputs into the Braille display. The keys may for example include six keys that can be used to input Braille codes, plus a space bar, backspace key and line space key of a Perkins Brailler. In another example, the keys may include a QWERTY keyboard.

Conventional Braille devices are designed for tactile reading of plain text content. In the conventional art, graphical information such as icons are interpreted and described in text form so that they can be presented in Braille code on the Braille device. As a result, content that includes icons, windows, radio buttons, check boxes, submit buttons and the like are difficult to present to a user on a Braille device.

SUMMARY OF THE INVENTION

The present technology may best be understood by referring to the following description and accompanying drawings that are used to illustrate embodiments of the present technology. However, generally, embodiments of the present technology are directed toward text-to-touch techniques.

In one embodiment, devices and systems include a Braille encoder, a haptic output controller and a plurality of Braille cells, a Braille wheel or the like. The Braille encoder is adapted to convert textural portions of content to Braille codes. The haptic output controller is adapted to convert non-textual portions of the content to haptic feedback. The Braille codes are then output on the Braille cells or wheel. In addition, the haptic feedback is selectively output with the corresponding Braille codes. The haptic feedback may include vibrations, heat, airflow, ultrasonic generated pressure waves or the like. The type, characteristic, parameter or the like of the haptic feedback may indicate the particular portion of the content, the type of the particular portion of the content, the class of the particular portion of the content, the characteristic of the particular portion of the content or the parameter of the particular portion of the content.

In another embodiment, a method includes receiving content including textual portions and one or more non-textual portions. The textual portions, such as letters, select words, numbers and punctuation, are converted to recognized Braille codes. One or more non-textual portions, such as metadata, graphics, formatting, decorations, hyperlinks, radio buttons, submit buttons, check boxes, windows, icons and fields, are converted to given haptic feedback. The Braille codes are output on the plurality of Braille cells or a Braille wheel. In addition, the given haptic feedback for each of one or more non-textual portions of the content is output with the corresponding Braille codes.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1A:
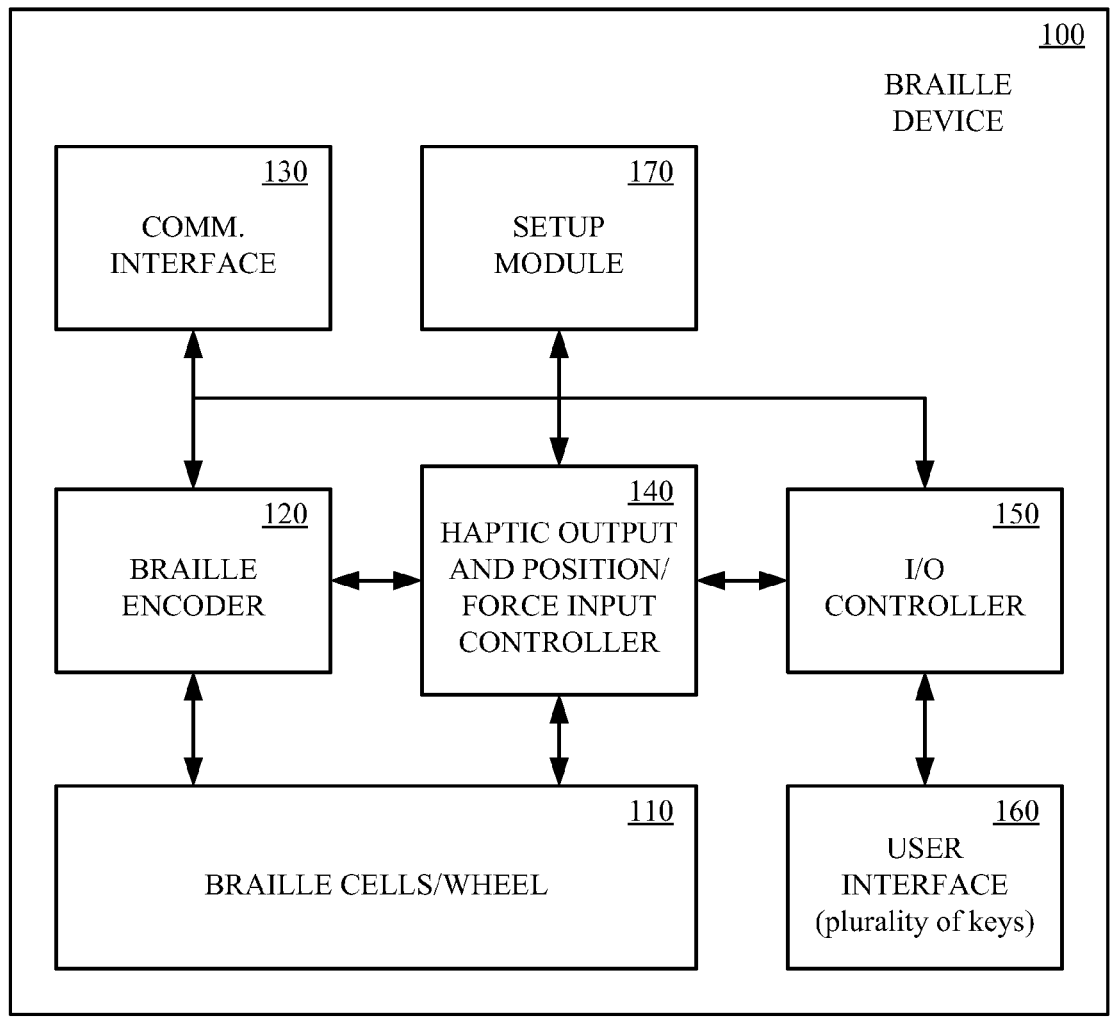
FIGS. 1A and 1B show block diagrams of Braille devices, in accordance with embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signal capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the action and processes of an electronic device such as an electronic computing device that manipulates and transforms data. The data are represented as physical (e.g., electronic, magnetic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Figure 1B:
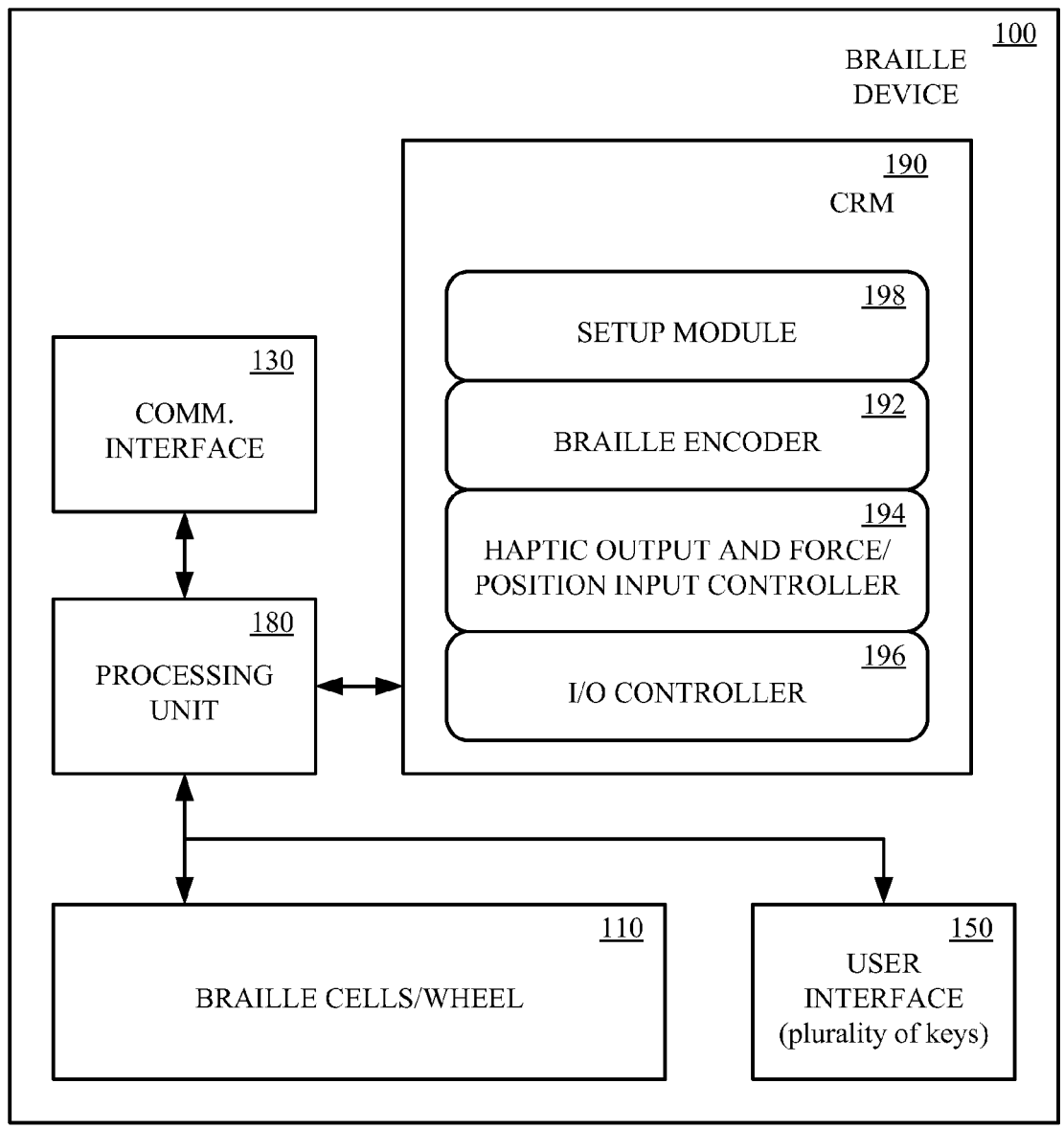

Referring to FIGS. 1A and 1B Braille devices, in accordance with embodiments of the present technology, are shown. The Braille device 100 includes a plurality of Braille cells or a rotating Braille wheel 110, a Braille encoder 120, one or more communication interfaces 130, one or more input/output controllers 140, 150 and one or more user interfaces 160. The Braille device 100 may also include a setup module 170.

The Braille cells or Braille wheel 110 may include piezoelectric operated actuators, electro-mechanical operated actuators, micro-electro-mechanical (MEM) actuators, or the like for outputting Braille codes. The input/output controllers 140, 150 of the Braille device include a haptic output controller and optionally a position/force input controller. One or more of the input/output controllers 140, 150 may be combined and/or may be implemented separately. For example, a user position detection controller and an input force controller may be implemented by the force/position input controller, or may each be implemented separately. Similarly, the haptic output controller may be implemented separately or may be implemented along with force/position input controller. The user interfaces may include Perkins Brailler keys, a QWERTY keyboard, a microphone, speakers and/or the like.

The Braille encoder 120, communication interface 130, haptic output and position/force input controller 140, input/out controllers 150, user interfaces 160 and setup/configuration module 170, may each be implemented in software, hardware, firmware or any combination thereof. For example, combinational logic may be utilized to implement the functions of the Braille encoder 120, the communication interface 139, the haptic output and position/force input controller 140, the input/out controllers 150, the user interfaces 160 and/or setup module 170 as illustrated in FIG. 1A. Similarly, a processing unit 180, such as a microcontroller, may execute computing device-executable instructions stored in one or more computing device-readable media 190 to implement the functions of the Braille encoder 192, haptic output and position/force input controller 194, input/out controller 196, setup module 198, and optionally one or more other applications, routines, utilities, modules, drivers, and/or the like, as illustrated in FIG. 1B.

Figure 2A:
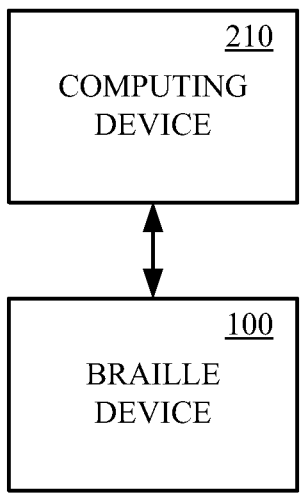
FIGS. 2A and 2B show block diagrams of a couple of exemplary platforms for utilizing Braille devices, in accordance with embodiments of the present technology.
Figure 2B:
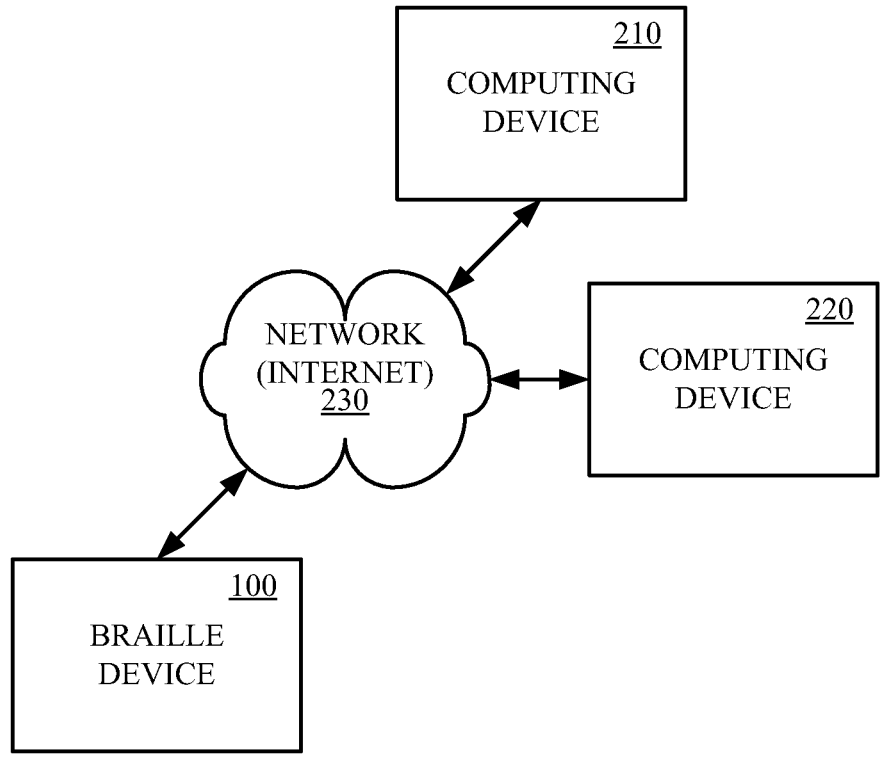

Referring now to FIGS. 2A and 2B, a couple of exemplary platforms for utilizing Braille devices, in accordance with embodiments of the present technology, are shown. As illustrated in FIG. 2A, the Braille device 100 may be communicatively coupled to a computing device 210. The computing device 210 may be a desktop personal computer (PC), laptop computer, netbook, smart phone, set top box (STB), digital book (e.g., Sony Reader), or the like. Although the Braille device 100 is illustrated as being separate and distinct from the computing device 210, in other embodiments the Braille device 100 may be integral to the computing device by implementing it as an internal or external peripheral of the computing device.

In other embodiments, the Braille device 100 may be communicatively coupled to one or more computing devices 210, 220 by one or more networks 230, as illustrated in FIG. 2B. Again, the computing devices 210, 220 may include desktop personal computers (PC), laptop computers, netbooks, smart phones, set top boxes (STB), digital books (e.g., Sony Reader), and/or the like. The one or more networks 230 may include the Internet, intranets, wide area networks (WAN), local area networks, and/or the like utilizing wired and/or wireless communication channels.

Referring to FIGS. 1A and 1B in general, the communication interface 130 of the Braille device is adapted to receive content. The content may include a webpage, a HyperText Markup Language (HTML) document, an extensible markup language (XML), a finable form, a Portable Document Format (PDF) document, a graphical user interface of an application, an Open Source Interface Definition (OSID) message, and/or the like. The Braille encoder 120, 192 converts the content received by the communication interface 130 into Braille codes for each of the recognized letters, numbers, words, and punctuation in the content having a corresponding Braille code. One or more portions of the content, that do not have a corresponding Braille code, are also provided to the haptic output controller 140, 194. For purposes of describing embodiments of the present technology, the term textual data is used hereinafter to refer to the portions of content, including recognized letters, number, words and punctuation, having corresponding Braille codes. The term non-textural data is used hereinafter to refer to the other portions of the contents, including metadata, graphics, formatting, decorations, one or more hyperlinks, one or more radio buttons, one or more submit buttons, one or more check boxes, one or more windows, one or more icons, one or more fields, and/or the like.

The haptic output controller 140, 194 converts one or more non-textual portions of the content to corresponding haptic feedback (e.g., tactile stimulation) for output on the Braille cells/wheel 110 and/or one or more user interfaces 160. The haptic feedback may include one or more types, each having one or more characteristics and/or parameters. For example, the haptic feedback may be a vibration having one or more characteristics, such as strong and/or weak vibrations (e.g., amplitude), slow or fast vibrations (e.g., frequency), constant or pulsing vibrations (e.g., intermittent). The haptic feedback may also, or in the alternative, include changes in temperature, changes in air flow, an ultrasonic sound wave and/or the like. For example, air holes proximate each Braille cell of the Braille wheel may selectively blow air past the user's finger during the output of corresponding Braille codes. In another implementation, the ultrasonic sound wave may be used to create a pressure sensation from acoustic radiation on a user's hand during the output of corresponding Braille codes. In another implementation, the actuators of each of the Braille cells or wheel may be selectively heated. The type and/or characteristic of the haptic feedback may be indicative of the particular portion of the content, the type of the portion of the content, the class of the portion of the content, and/or the like.

In one implementation, the haptic output controller converts a hyper link in the content to a vibration feedback applied to the Braille cells when the codes of the corresponding text string of the hyper link are output. In another implementation, the haptic output controller converts the selection choice of a radio button to vibrations having different pulsing characteristics when the Braille codes of the corresponding text strings are output on the Braille cells. The type, characteristic and/or parameter of the haptic feedback may also be used to indicate the sequence, order or the like of a plurality of non-textual portions of the content. For example, a first frequency of a vibrating haptic feedback may indicate a first hyperlink, a second frequency that is faster than thee first frequency may indicate a second hyperlink, and so on.

One or more portions of the non-textual content may also be converted to Braille codes describing the non-textual content and corresponding haptic feedback indicating that the Braille codes describe non-textual content instead of textual content. For example, a 'save" icon may be converted to the Braille code representing "save" and a haptic feedback such as an elevated temperature applied to the one or more Braille cells or the Braille wheel outputting the Braille code representing "save" to indicate that it is a 'save' icon.

The setup module 170, 198 may be adapted to configure the Braille cells or wheel 110, the Braille encoder 120, the communication interface 130, the haptic output and position/force input controller 140, 194, input/output controllers 150, 196, and/or user interface 160. For example, the setup module 170, 198 may be adapted to allow a user to configure what type of haptic feedback is output for each of a plurality of non-textual portions of content. Similarly, the setup module 170, 198 may be adapted to configure the characteristics and/or parameters of the haptic feedback for each of a plurality of non-textual portion of content in accordance with the preferences of the user.

The haptic output and position/force input controller 140, 194 may convert position and/or force inputs received from a user via the Braille cells/wheel 110 and/or one or more other user interfaces 160 to inputs to the Braille device 100. The inputs may be used to control conversion by the Braille encode 120, output on the Braille cells/wheel 110 and/or the like. The inputs may also or alternatively be communicated to one or more other devices 210, 220, such as the computing device providing the content. In one implementation, an optical sensor detects the position of the user's hand or finger relative to one or more of the plurality of Braille cells. The hand or finger position may be used, for example, to determine when to apply a vibrating haptic feedback to Braille cells outputting text corresponding to a hyper link.

In another implementation a force gauge may be used to detect the pressure of the user's hand or finger on one or more given Braille cells or the Braille wheel. If the pressure exceeds a predetermined value, for example, the haptic output and position/force input controller 140, 194 interprets the pressure as a user input. For example, if the force does not exceed a predetermined value it is interpreted to be that the user is tactile reading the Braille cell. A user at some point may press upon one or more vibrating Braille cells with a force exceeding the predetermined value, having a predetermined period and/or the like. The pressure detected by the force gauge of the haptic output and position/force input controller 140, 194 is interpreted as an input selecting/activating the hyper link represented by the vibrating Braille cells. A sequence of different level of force within a predetermined amount of time, such as a double tap, may be used to avoid false readings due to inadvertent pressure exerted by the user during normal reading of the cells. In response to such force input, the haptic output and position/force input controller 140, 194 may generate a signal, data, command or the like specifying selection of the hyper link. The signal, data, command or the like may be output by the communication interface 130 to the computing device 210 providing the content. In response to the signal, data, command or the like specifying selection of the hyper link, the computing device 210 may send new content specified by the hyperlink to the Braille device 100 for output to the user. The Braille encoder 120, 192 may then output the new content on the Braille cells/wheel 110. Alternatively, one or more inputs, in response to a given haptic feedback, may be received via one or more other user interfaces 150, such as the Perkins Braille keys, the QWERTY keyboard or the like.

It is appreciated that many other devices or subsystems (not shown) may be connected to the Braille device 100, one or more computing device 210, 210 and/or the networks 230 in a similar manner. Conversely, all of the devices shown in FIGS. 1A, 1B, 2A and 2B need not be present to practice the present technology. The devices and subsystems can also be interconnected in different ways from that shown in FIGS. 1A, 1B, 2A and 2B. Furthermore, the operation of the computing devices 210, 220 and networks 230, as shown in FIGS. 1A, 1B, 2A and 2B, are readily known in the art and therefore are not discussed in detail herein.

Figure 3A:
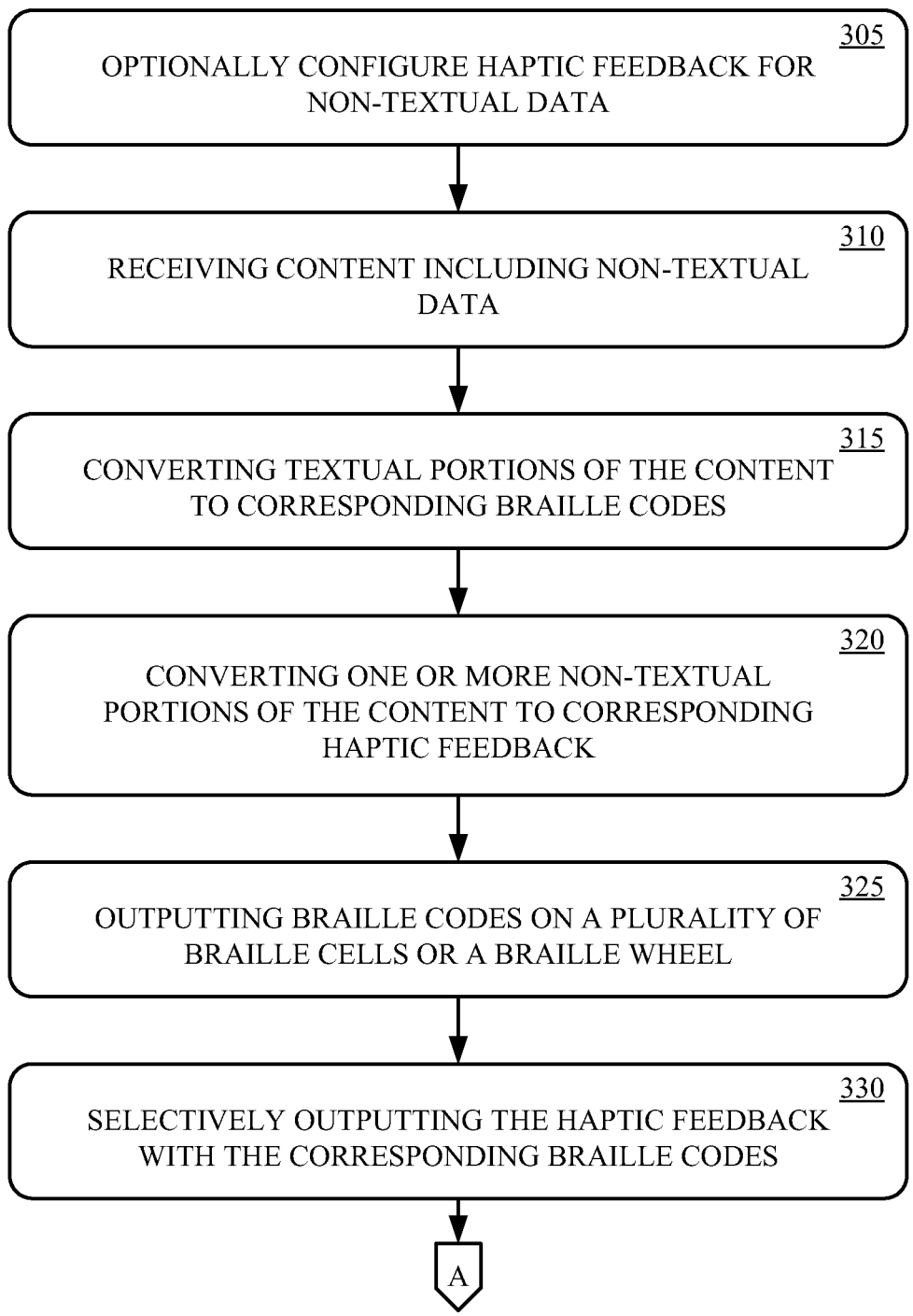
FIGS. 3A and 3B show a flow diagram of a method of presenting content using Braille, in accordance with one embodiment of the present technology.
Figure 3B:
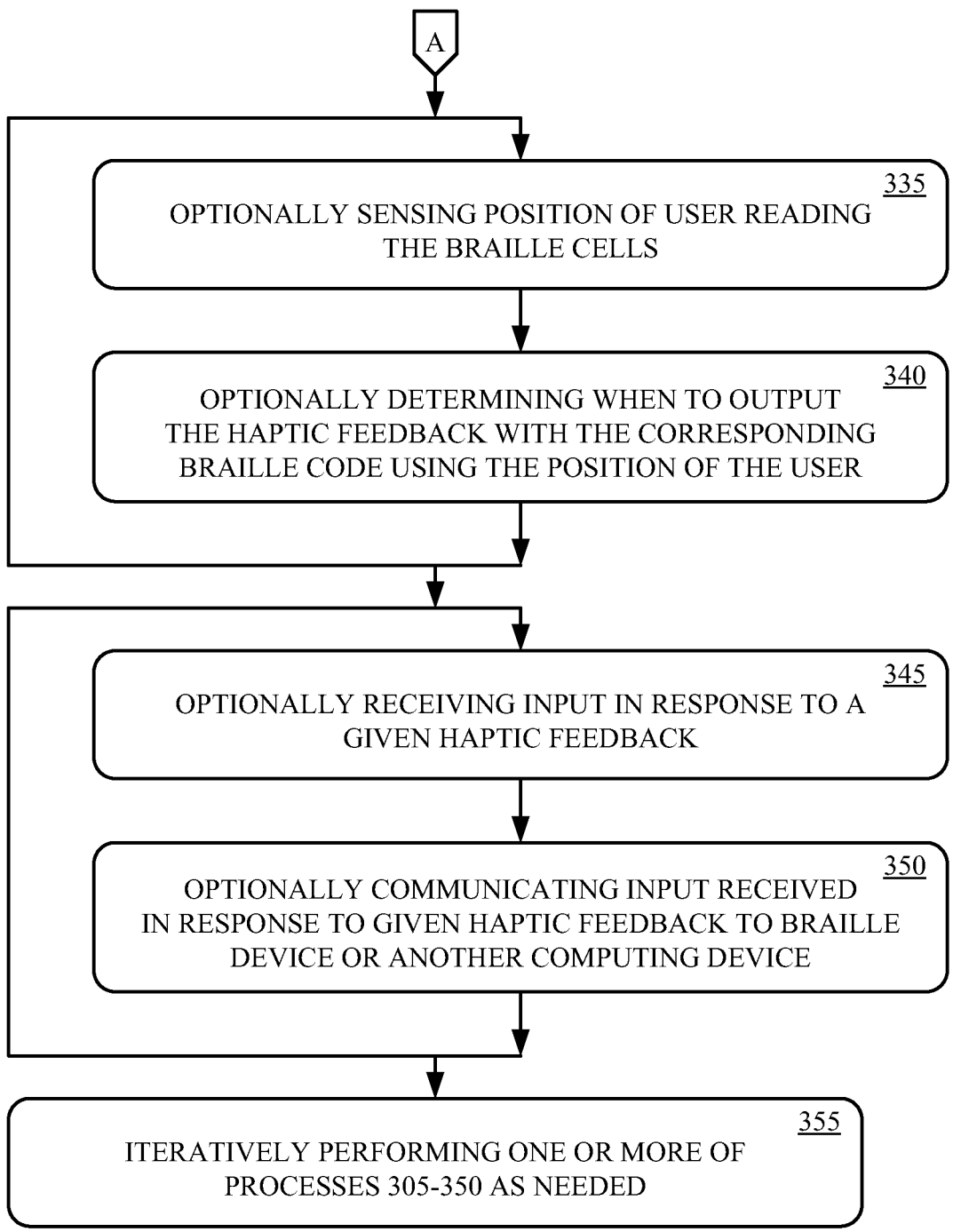

Referring now to FIGS. 3A and 3B, a method of presenting content using 
Braille, in accordance with one embodiment of the present technology, is shown. The method may be implemented as computing device-executable instructions (e.g., a computer program) that are stored in computing device-readable media (e.g., computer memory) and executed by a computing device (e.g., processor). In addition, although specific operations are disclosed, such operations are exemplary. The method may not include all the operation illustrated in FIGS. 3A and 3B. Also, the method may include various other operations and/or variations of the operations shown in FIGS. 3A and 3B. Likewise, the sequence of the operations can be modified.

The method begins with receiving content that includes both textual data and non-textual data, at 310. In one implementation, the content may be a webpage, a HyperText Markup Language (HTML) document, an extensible markup language (XML), a fillable form, a Portable Document Format (PDF) document, a graphical user interface of an application, an Open Source Interface Definition (OSID) message, and/or the like. The non-textual data may include metadata, graphics, formatting, decorations, hyperlinks, radio buttons, submit buttons, check boxes, windows, icons, fields, and/or the like.

At 315, the textual portions of the content are converted to a corresponding Braille codes. In one implementation, letters, select words, numbers, and punctuation are converted to their corresponding Braille code. At 320, one or more non-textual portions of the content are converted to a corresponding haptic feedback. The haptic feedback may have a type, characteristic, parameter and/or the like indicative of the particular portion of the content, the type of the particular portion of the content, the class of the particular portion of the content and/or the like. In one implementation, the content is parsed to identify metadata specifying a hyperlink. The hyperlink is a reference to another item of content that a user may navigate to by indicating selection of the hyperlink. In the conventional art, hyperlinks are typically displayed for visual reading by decorating the text with a different color, font and/or style from plain textual content. The metadata specifying the hyperlink is converted to a corresponding haptic feedback. For example, the hyper link may be converted to a constant vibration applied to the Braille code of the corresponding text of the hyperlink.

At 325 the Braille code is output on a plurality of refreshable Braille cells or a rotating Braille wheel. At 330, the haptic feedback is selectively output with the corresponding Braille code. In one implementation, the haptic feedback is selectively output on the plurality of refreshable Braille cells or the rotating Braille wheel with the corresponding Braille code. In the event that there is haptic feedback for two different non-textual portions in close proximity to each other when outputting the content on the Braille device, one or more of the characteristics of the haptic feedback may be varied to differentiate the different non-textual portions. In another implementation, different haptic feedback types may used to differentiate the different non-textual portions. In yet another implementation, a different haptic feedback may be output to indicate the boundary between different non-textual portions. For example, a slower or faster vibration may be output between two adjacent decorations.

At optional process 335, the position on the plurality of Braille cells that the user is currently tactile reading may be sensed. At optional process 340, the position may be used to determine when to apply the haptic feedback output with the corresponding Braille code output.

At optional process 345, an input received in response to a given haptic feedback may be determined. For example, a force exerted by a user on one or more of the Braille cells or the Braille wheel in response to a given haptic feedback may be determined. If the force is equal to and/or greater than a predetermined value it is detected as an input in response to a given haptic feedback. At optional process 350, the input received in response to a given haptic feedback may be communicated to an application executing on the Braille device and/or another computing device. For example, a signal indicating selection of the portion of the text corresponding to the Braille codes output on the one or more Braille cells or the Braille wheel, when a force having a given characteristic is sensed one the Braille cells or Braille wheel is output to a computing device providing the content.

At 355, one or more of the processes of 305-350 may be iteratively performed. For example, the user may change the configuration of the haptic feedback types, characteristics and/or parameters. The process of sensing the position of the user reading the Braille cells may be repeatedly performed while content is converted and output on the Braille device. Similarly, new content may be received, converted and output. For instance, an input received and communicated at processes 345-350 may cause new content pointed to be a hyper link to be received in response to a vibrating haptic feedback indicating the hyperlink in the previously output content.

Accordingly, embodiments of the present technology advantageously enable presenting non-textual data in content to visually impaired users. Haptic feedback is used to present the non-textual portions along with Braille codes of the textual portions. The type, characteristics and/or parameters of the haptic feedback may advantageously be configured to differentiate the different types, characteristics and/or parameters non-textual portions of the content.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A system comprising:
    a Braille encoder to convert textual portions of a content to a plurality of Braille codes;
    a haptic output controller to convert non-textual portions of the content to haptic feedback;
    a plurality of Braille cells or a Braille wheel to output the Braille codes and selectively output the haptic feedback with corresponding Braille codes, and
    a position input controller to determine a position of a user relative to one or more of the plurality of Braille cells with the position input controller selectively outputting the haptic feedback representing the non-textual portions of the content responsive to a determination that the position of the user is proximate one or more of the Braille cells outputting the corresponding Braille codes.

2. The system according to claim 1, wherein a non-textual portion of the content is a first non-textual portion of the content, and the haptic feedback has a first type, a first characteristic, or a first parameter indicative of the first non-textual portion of the content, a type of the first non-textual portion of the content, a class of the first non-textual portion of the content, a characteristic of the first non-textual portion of the content, or a parameter of the first non-textual portion of the content and the haptic feedback has a second type, characteristic, or parameter indicative of a second non-textual portion of the content, a type of the second non-textual portion of the content, a class of the second non-textual portion of the content, a characteristic of the second non-textual portion of the content, or a parameter of the second non-textual portion of the content.

3. The system according to claim 1, wherein the non-textual portion of the content comprises a hyperlink and the haptic feedback comprises a vibration to indicate the hyperlink.

4. The system according to claim 1, further comprising a force input controller to determine a force applied by a user to one or more of the plurality of Braille cells or the Braille wheel.

5. The system according to claim 4, further comprising the force input controller to further output a signal indicative of selection of a portion of textual content corresponding to the Braille codes output on the one or more Braille cells or the Braille wheel when a force having a given characteristic is sensed on the one or more of the plurality of Braille cells or the Braille wheel.

* * * * *